US009015800B2

(12) United States Patent
Newton et al.

(10) Patent No.: US 9,015,800 B2
(45) Date of Patent: Apr. 21, 2015

(54) USER SECURITY COMPARISON AND REVERSION

(71) Applicants: Glen E. Newton, Roseville, MN (US); Mark Wiggins, Roseville, MN (US); Douglas P. Van Vreede, Roseville, MN (US)

(72) Inventors: Glen E. Newton, Roseville, MN (US); Mark Wiggins, Roseville, MN (US); Douglas P. Van Vreede, Roseville, MN (US)

(73) Assignee: Unisys Corporation, Blue Bell, PA (US)

( * ) Notice: Subject to any disclaimer, the term of this patent is extended or adjusted under 35 U.S.C. 154(b) by 44 days.

(21) Appl. No.: 13/873,482

(22) Filed: Apr. 30, 2013

(65) Prior Publication Data
US 2014/0325593 A1  Oct. 30, 2014

(51) Int. Cl.
| G06F 17/30 | (2006.01) |
| G06F 21/57 | (2013.01) |
| G06F 21/50 | (2013.01) |
| H04L 29/06 | (2006.01) |

(52) U.S. Cl.
CPC ............... *G06F 21/57* (2013.01); *G06F 21/50* (2013.01); *H04L 63/20* (2013.01); *H04L 63/102* (2013.01)

(58) Field of Classification Search
CPC ......... G06F 21/57; G06F 21/50; H04L 63/20; H04L 67/306
USPC ................................................ 726/2; 707/684
See application file for complete search history.

(56) References Cited

U.S. PATENT DOCUMENTS

| 8,296,271 B1 * | 10/2012 | Richardson et al. ........... 707/674 |
| 2005/0154664 A1 * | 7/2005 | Guy et al. ........................ 705/35 |
| 2009/0199294 A1 * | 8/2009 | Schneider ........................ 726/18 |

* cited by examiner

*Primary Examiner* — Baotran N To
(74) *Attorney, Agent, or Firm* — Richard J. Gregson

(57) ABSTRACT

A web interface may generate reports regarding changes in user security parameters in a computer network. The report may ease administrator's duties analyzing log files to determine the modifications to user accounts. The administrator may be presented with an option to revert a user to a prior state of user security parameters. Thus, the interface provides the administrator the ability to generate reports and modify user accounts from a single web page.

15 Claims, 8 Drawing Sheets

402

| Settings | | | | | |
|---|---|---|---|---|---|
| Start Date/Time | 12/06/2012 | 12 | : | 00 | AM |
| End Date/Time | 12/06/2012 | 10 | : | 45 | AM |
| User-ids excluded from report | | | | | |
| Include disabled users | ☐ | | | | |
| Log file cycles on mass storage | Only cycles on mass storage | | | | |
| Tape name | | | | | |
| Alternate system log file | | | | | |
| Alternate log file starting cycle | | | | | |
| Settings updated | Never saved | | | | |

| Summary | |
|---|---|
| The report completed successfully. | |
| Last run | start 12/12/2012 5:11:27 PM end 12/12/2012 5:11:30 PM |
| User-ids that were changed | 2 |
| Total changes found | 10 |

Modified Users

| User-id | Modified | Modified by |
|---|---|---|
| *BADENV | 12/4/2012 4:04:36 PM | SECURITY |
| *BADENV | 12/4/2012 1:38:43 PM | SECURITY |
| *BADENV | 12/4/2012 1:38:35 PM | SECURITY |
| *BADENV | 12/4/2012 1:38:19 PM | SECURITY |
| *TOY | 12/3/2012 1:46:37 PM | SECURITY |
| *TOY | 12/3/2012 1:45:50 PM | SECURITY |
| *TOY | 12/3/2012 1:44:43 PM | SECURITY |
| *TOY | 12/3/2012 1:44:03 PM | SECURITY |
| *TOY | 12/3/2012 9:36:18 AM | SECURITY |
| *TOY | 12/3/2012 9:34:15 AM | DOUGV |

| User-id BAWTST | Modified 11/30/2012 9:27:49 AM | Modified by SECURITY | |
|---|---|---|---|
| User-id Attribute | Before | After | Current |
| Session:Terminal Timeout:Initial setting | Initial value | System standard | System standard |
| Session:Terminal Timeout:Initial value | 240 | 0 | 0 |
| Session:Terminal Timeout:Changes allowed | User may disable | User may change up to maximum | User may change up to maximum |
| Session:Terminal Timeout:Maximum value | 0 | 55 | 55 |

[Disable User] [Exclude From Report] [Revert User]

Terminal Timeout

| | |
|---|---|
| Initial setting | Initial value ▼ |
| Initial value | 240 |
| Changes allowed | User may disable ▼ |
| Maximum value | |

FIG. 4D

USER SECURITY COMPARISON AND REVERSION

FIELD OF THE DISCLOSURE

The instant disclosure relates to computer networks. More specifically, this disclosure relates to user security in computer networks.

BACKGROUND

Computer systems have become a major part of any project. For example, large corporations often have hundreds or thousands of computer systems in operation for use by their employees. Because each of the computer systems may have access to confidential data on a computer network, employees authenticate themselves to the computer system before the computer system provides access to the secure data. Each employee may be provided a user account, such as a username and password, which the employee uses to authenticate himself to the computer. The user accounts may include a number of restrictions or permissions defining what the employee may access and/or change. Modifying these restrictions or permissions without proper authorization may result in an employee having too many permissions on the computer network. Thus, changes in permissions of a user account may be indicative of behavior not conforming to security policies established within the corporation.

In the past, an administrator of a server system manually extracted relevant log entries from system logs in a first application, and then scanned them manually to identify changes. If changes were found, the administrator had to launch a second application, such as a security administration tool, and then make the necessary changes to correct the user security records. The administrator may, for example, have been reviewing changes to users that violated a system policy. Updating user security records through a second application after identifying the changes required opening the user-id record, finding the attribute(s) to revert, typing in the values for each attribute that should be reverted, and saving the changed user-id record.

FIG. 1 is a flow chart illustrating a conventional method for reviewing user account changes. At block 102, a viewer tool is launched to view the log files. At block 104, the administrator manually scans for changes in user accounts. At block 106, a security administration tool is launched. At block 108, a user account may be manually modified through the security administration tool.

Manually running log reports and examining them for changes is time-consuming and error-prone. The conventional technique requires visual identification of small changes in a sea of data. In addition, making updates to revert a user's security record to a prior state requires several steps that are also subject to human error.

SUMMARY

A single interface may be provided for an administrator to review changes to user security parameters and revert user security parameters for a user to a previous state. The interface facilitates easier analysis of user security parameters by providing a report of the changes. Furthermore, the administrator may sort the results based on the user that was modified, the date of modification, and/or who made the change, rather than being forced to use the one type of report previously available.

According to one embodiment, a method may include retrieving, at a server from a security database, user security parameters for at least one user. The method may also include retrieving, at the server from a system log, log files describing changes in the user security parameters for the at least one user. The method may further include generating, at the server, a report comparing the user security parameters and the changes in the user security parameters.

According to another embodiment, a computer program product may include a non-transitory computer readable medium comprising code to perform the steps of retrieving, from a security database, user security parameters for at least one user; retrieving, from a system log, log files describing changes in the user security parameters for the at least one user; and generating a report comparing the user security parameters and the changes in the user security parameters.

According to a further embodiment, an apparatus may include memory and a processor coupled to the memory. The processor may be configured to perform the steps of retrieving, from a security database, user security parameters for at least one user; retrieving, from a system log, log files describing changes in the user security parameters for the at least one user; and generating a report comparing the user security parameters and the changes in the user security parameters.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and specific embodiment disclosed may be readily utilized as a basis for modifying or designing other structures for carrying out the same purposes of the present invention. it should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed system and methods, reference is now made to the following descriptions taken in conjunction with the accompanying drawings.

FIGS. 4A-4D are screen shots illustrating web pages for viewing and modifying user security parameters according to one embodiment of the disclosure.

DETAILED DESCRIPTION

Figure 1:
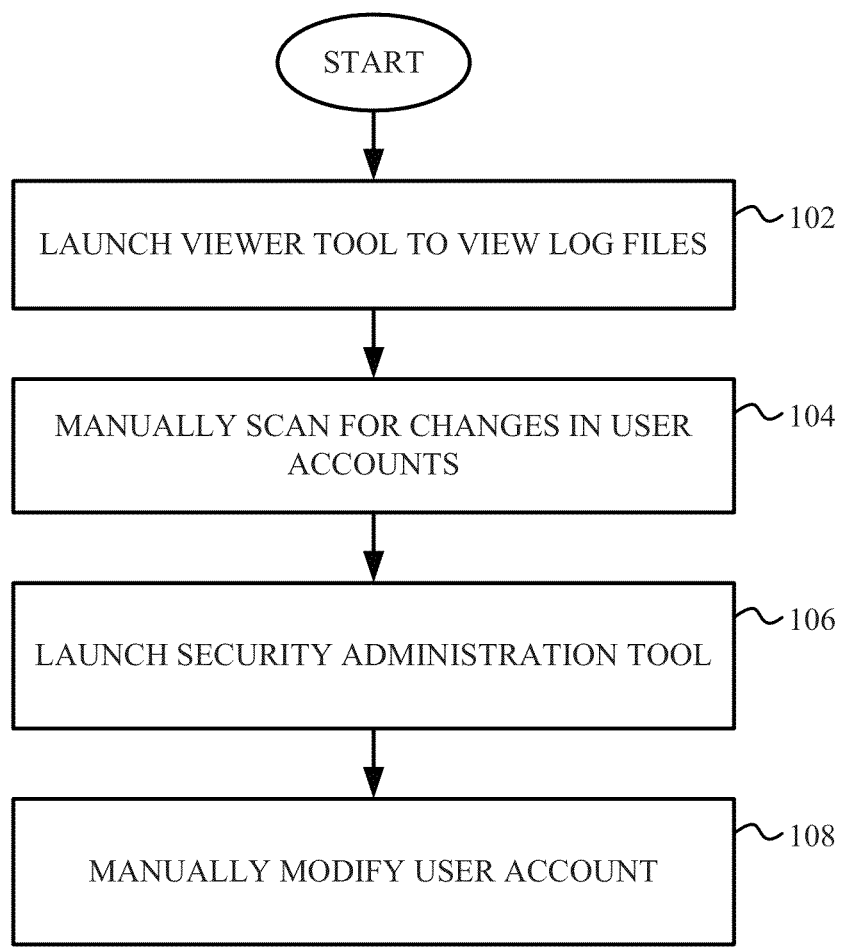
FIG. 1 is a flow chart illustrating a conventional method for reviewing user account changes.
Figure 2:
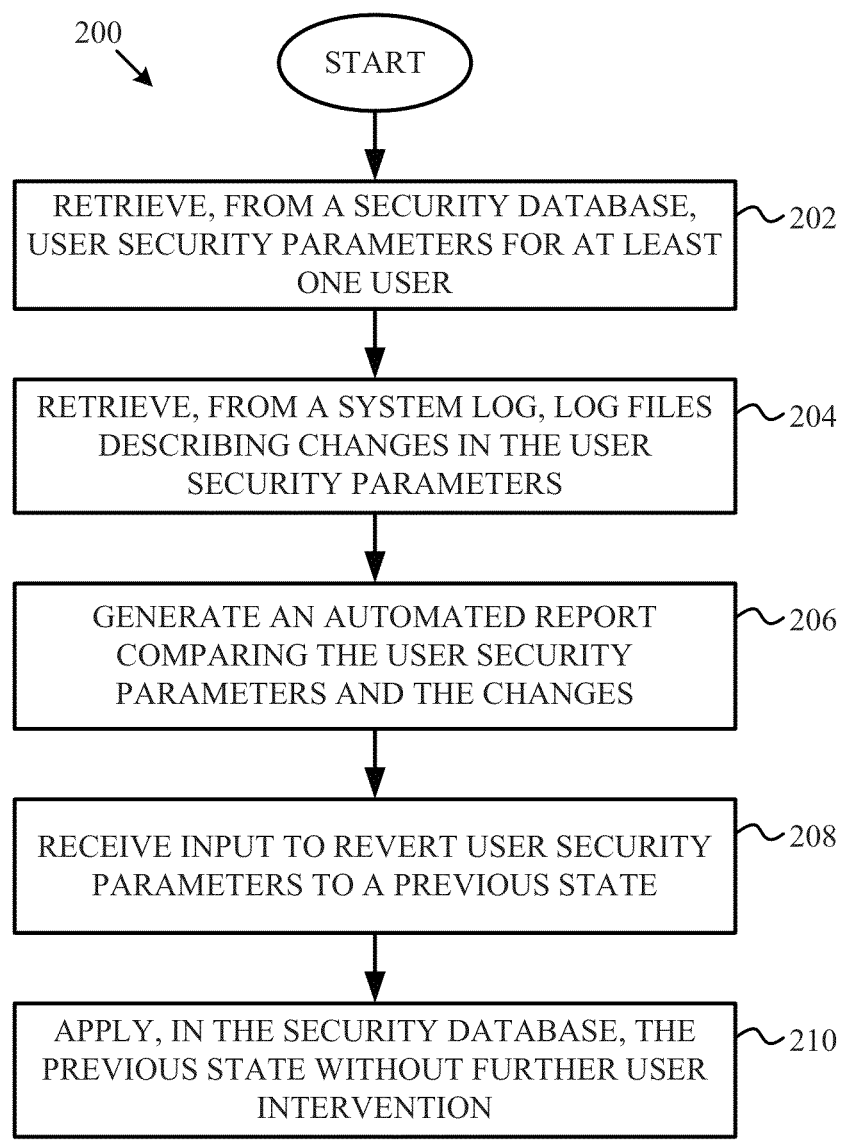
FIG. 2 is a flow chart for identifying user security parameter changes and for reverting the user security parameters to a previous state according to one embodiment of the disclosure.

FIG. 2 is a flow chart for identifying user security parameter changes and for reverting the user security parameters to a previous state according to one embodiment of the disclosure. A method 200 begins at block 202 with retrieving, from a security database, user security parameters for at least one user. The method 200 may begin when a user accesses a web page for displaying the user security parameter changes.

Figure 3:
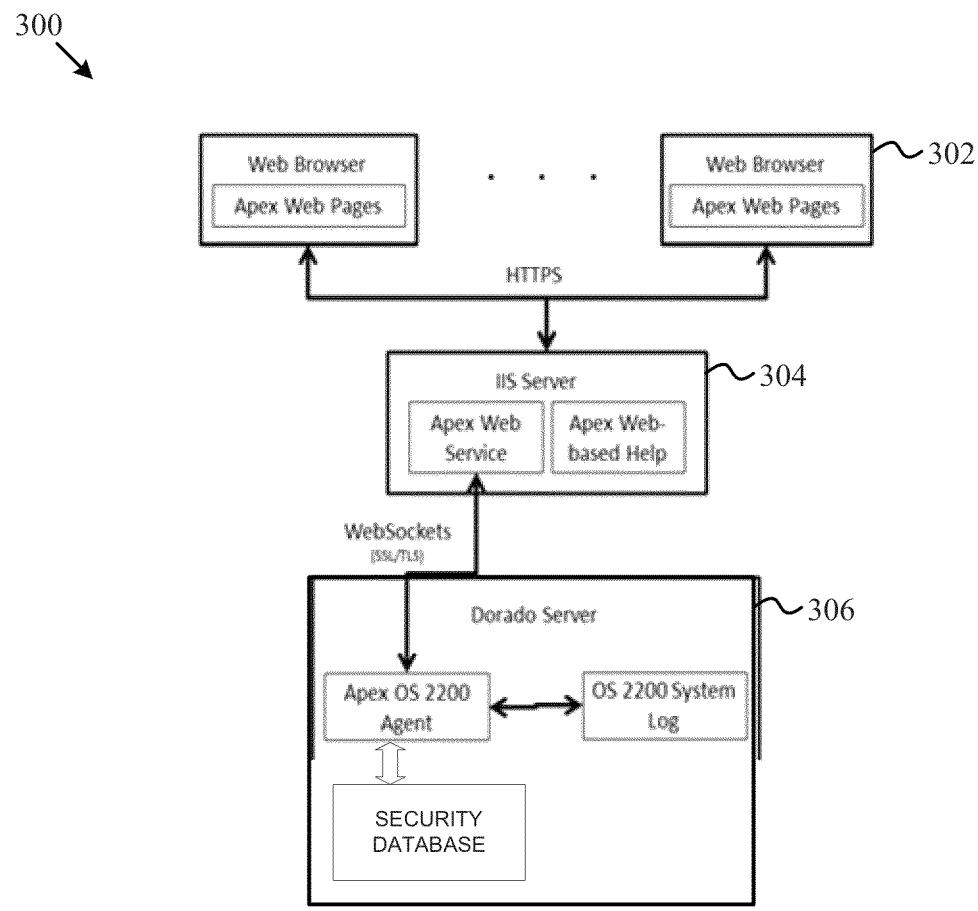
FIG. 3 is a block diagram illustrating a system for allowing a user to view and modify user security parameters through a web page according to one embodiment of the disclosure.

FIG. 3 is a block diagram illustrating a system for allowing a user to view and modify user security parameters through a web page according to one embodiment of the disclosure. Users may access a client device 302 operating an application, such as a web browser, for interpreting web pages. The web pages may contain information regarding user security parameters generated by a web server 304 and transferred over a protocol such as secure hypertext transfer protocol (HTTPS). The web pages may be formatted according to the hypertext markup language (HTML). The web server 304 may execute applications including a web service and web-based help. The web service of the web server 304 may communicate with a server system 306. The server system 306 may execute an application, such as a corporate application. The server system 306 may include an agent, a system log, and a security database. The agent of the server system 306 may allow interaction with the system log and the security database from devices, such as the web server 304, coupled to the server system 306.

An administrator's access to the web server 304 may include settings that influence the scope of a request. For example, the request may specify a date and time range, user-ids to exclude, whether to include disabled users, and/or locations of log files to search. A screen shot showing options for the request is shown in FIG. 4A.

Returning to FIG. 2, at block 204, log files describing changes in the user security parameters are retrieved from a system log. The web server 304 may interact with the agent of the server system 306 to retrieve the system log.

A system log file may be stored as a set of log file cycles for different date ranges. Some log file cycles may be stored on disk storage and be immediately available. Other log file cycles may be stored on magnetic tape and be accessible when the tape is inserted in a drive. In general, the administrator does not know the time and date at which one cycle ends and the next begins, so the user interface may allow the administrator to select a range of records by their time of occurrence, without having to identify which log cycles they are in.

Some of the log records for the time span of interest may not be readily available because they have been transferred to tape and removed from disk storage. To determine whether or not this is the case, a report handler of the web server 304 may call the agent of the server system 306 to determine the location of all of the records needed for the report.

The report interface may provide the administrator a choice of only retrieving records available on mass storage, retrieving all, regardless of their location, and prompting the administrator before initiating a tape mount to obtain the records.

Furthermore, certain log data may be moved from the system standard log file to alternate log files. In this case, the agent may be unable to determine automatically which log cycles contain the requested data. In one embodiment, the agent may start a search with the oldest log cycle available.

Once the required log cycles are determined to be available, the log reader component of the agent in the server system 306 may begin requesting log records of the type that contain user security parameters. As each record is found, the server system 306 may keep a subset of the information in the log entry. When log reading completes, the server system 306 may send the results to the report handler in the web server 304, which formats the results in a web page and displays the page to the administrator.

At block 206, a report is automatically generated comparing the user security parameters and the changes. The report may be a web page for display on the administrator's web browser. The report may include a list of modified users, when the users were modified, and/or by whom the user was modified. A screen shot showing a report is shown in FIG. 4B.

The administrator may sort the report based on the user-id that was modified, the date of modification, or who made the change. Secondary sorts within each category may place records with matching primary sort keys in the order most likely to be useful when investigating changes in user records. For example, the report shown above is sorted ascending by user-id, and within each user-id, it is sorted by descending modification date, because the most recent changes are likely to be of most interest.

Sorting by user-id may be convenient for discovering how a particular user got his security attributes changed. This might be triggered by an incident in which the user either carried out an action that should not have been permitted or was denied the authorization to perform an action that he should have been allowed to do.

Sorting by the date of modification may be convenient for investigating a security incident that happened at a known time but the user-id that caused the incident might not be known. By looking at security attribute changes leading up to that time, the investigator can determine if a change in some users' security attributes might have led to the incident.

Sorting by who made the change may be convenient for discovering changes made by a particular administrator; this might happen if the administrator is under suspicion for accidental or intentional modification of the user security database.

The report may include options to expand or de-expand information regarding each user. When a user requests details by clicking on the expand icon for a user-id, the web server 304 may obtain additional records regarding the user. An expanded view of modifications to a user is shown in FIG. 4C. When a security administrator modifies a user's security attributes, he may make several changes before committing the changes into the security database. In the example of FIG. 4C, at 9:27:49 AM on Nov. 30, 2012 the security administrator changed 4 security attributes for the user BAWTST. A "Current" column in this example matches the "After" column, which shows that the attributes were not further changed after that time.

Returning to FIG. 2, at block 208, input is received from a user to revert user security parameters to a previous state. For example, an administrator may select the "Revert User" button of FIG. 4C. After selecting to revert a user to a prior state, a screen may be displayed to the administrator to confirm the changes. For example, a screen shot showing a user security record with values set to a prior state is shown in FIG. 4D. After the administrator has verified that a reversion to the prior state is appropriate in the context of the rest of the security record, he can press a "save" button in the web page and save the reverted changes into the security database. Referring back to FIG. 2, at block 210, the previous state of user security parameters may be applied to the security database without further user intervention.

Figure 5:
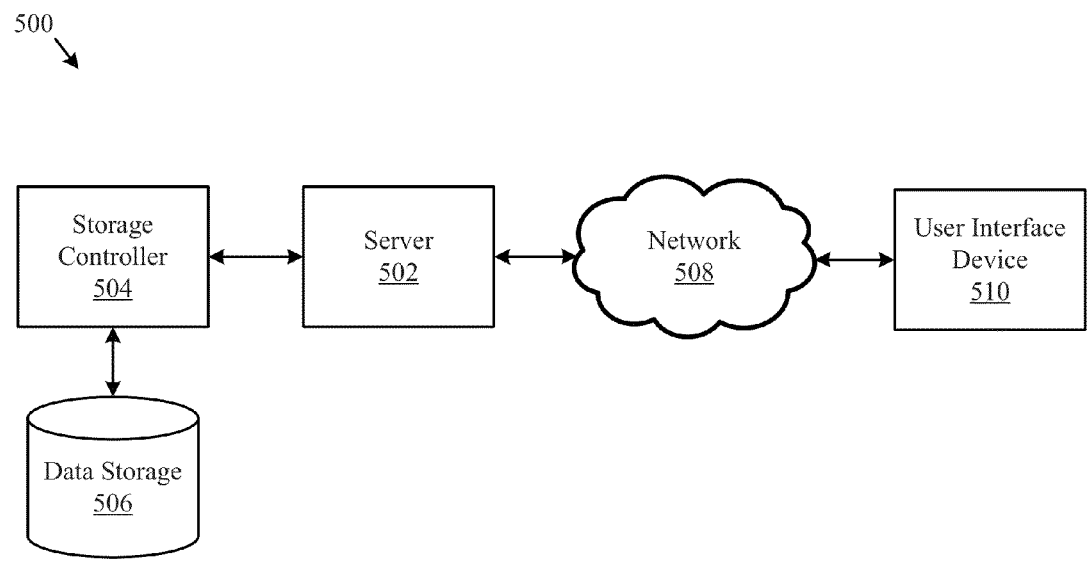
FIG. 5 is a block diagram illustrating a computer network according to one embodiment of the disclosure.

FIG. 5 illustrates one embodiment of a system 500 for an information system, including a system for reporting and modifying user security parameters. The system 500 may include a server 502, a data storage device 506, a network 508, and a user interface device 510. The server 502 may also be a hypervisor-based system executing one or more guest partitions hosting operating systems with modules having server configuration information. In a further embodiment, the system 500 may include a storage controller 504, or a storage server configured to manage data communications between the data storage device 506 and the server 502 or other components in communication with the network 508. In an alternative embodiment, the storage controller 504 may be coupled to the network 508.

In one embodiment, the user interface device 510 is referred to broadly and is intended to encompass a suitable processor-based device such as a desktop computer, a laptop computer, a personal digital assistant (PDA) or tablet computer, a smartphone or other mobile communication device having access to the network 508. When the device 510 is a mobile device, sensors (not shown), such as a camera or accelerometer, may be embedded in the device 510. When the device 510 is a desktop computer the sensors may be embedded in an attachment (not shown) to the device 510. In a further embodiment, the user interface device 510 may access the Internet or other wide area or local area network to access a web application or web service hosted by the server 502 and may provide a user interface for enabling a user to enter or receive information.

The network 508 may facilitate communications of data between the server 502 and the user interface device 510. The network 508 may include any type of communications network including, but not limited to, a direct PC-to-server connection, a local area network (LAN), a wide area network (WAN), a modem-to-modem connection, the Internet, a combination of the above, or any other communications network now known or later developed within the networking arts which permits two or more computers to communicate.

Figure 6:
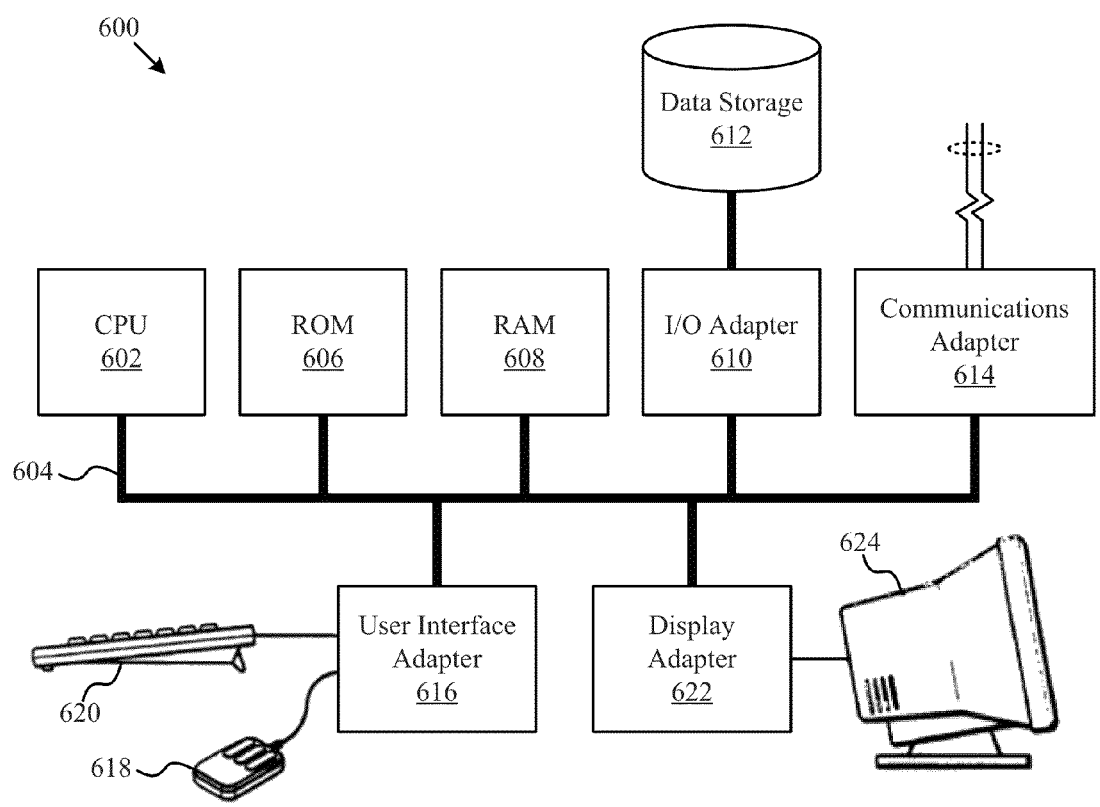
FIG. 6 is a block diagram illustrating a computer system according to one embodiment of the disclosure.

FIG. 6 illustrates a computer system 600 adapted according to certain embodiments of the server 502 and/or the user interface device 510. The central processing unit ("CPU") 602 is coupled to the system bus 604. The CPU 602 may be a general purpose CPU or microprocessor, graphics processing unit ("GPU"), and/or microcontroller. The present embodiments are not restricted by the architecture of the CPU 602 so long as the CPU 602, whether directly or indirectly, supports the operations as described herein. The CPU 602 may execute the various logical instructions according to the present embodiments.

The computer system 600 also may also include random access memory (RAM) 608, which may be synchronous RAM (SRAM), dynamic RAM (DRAM), synchronous dynamic RAM (SDRAM), or the like. The computer system 600 may utilize RAM 608 to store the various data structures used by a software application. The computer system 600 may also include read only memory (ROM) 606 which may be PROM, EPROM, EEPROM, optical storage, or the like. The ROM may store configuration information for booting the computer system 600. The RAM 608 and the ROM 606 hold user and system data, and both the RAM 608 and the ROM 606 may be randomly accessed.

The computer system 600 may also include an input/output (I/O) adapter 610, a communications adapter 614, a user interface adapter 616, and a display adapter 622. The I/O adapter 610 and/or the user interface adapter 616 may, in certain embodiments, enable a user to interact with the computer system 600. In a further embodiment, the display adapter 622 may display a graphical user interface (GUI) associated with a software or web-based application on a display device 624, such as a monitor or touch screen.

The I/O adapter 610 may couple one or more storage devices 612, such as one or more of a hard drive, a solid state storage device, a flash drive, a compact disc (CD) drive, a floppy disk drive, and a tape drive, to the computer system 600. According to one embodiment, the data storage 612 may be a separate server coupled to the computer system 600 through a network connection to the I/O adapter 610. The communications adapter 614 may be adapted to couple the computer system 600 to the network 508, which may be one or more of a LAN, WAN, and/or the Internet. The user interface adapter 616 couples user input devices, such as a keyboard 620, a pointing device 618, and/or a touch screen (not shown) to the computer system 600. The display adapter 622 may be driven by the CPU 602 to control the display on the display device 624. Any of the devices 602-622 may be physical and/or logical.

The applications of the present disclosure are not limited to the architecture of computer system 600. Rather the computer system 600 is provided as an example of one type of computing device that may be adapted to perform the functions of the server 502 and/or the user interface device 510. For example, any suitable processor-based device may be utilized including, without limitation, personal data assistants (PDAs), tablet computers, smartphones, computer game consoles, and multi-processor servers. Moreover, the systems and methods of the present disclosure may be implemented on application specific integrated circuits (ASIC), very large scale integrated (VLSI) circuits, or other circuitry. In fact, persons of ordinary skill in the art may utilize any number of suitable structures capable of executing logical operations according to the described embodiments. For example, the computer system 600 may be virtualized for access by multiple users and/or applications.

Figure 7A:
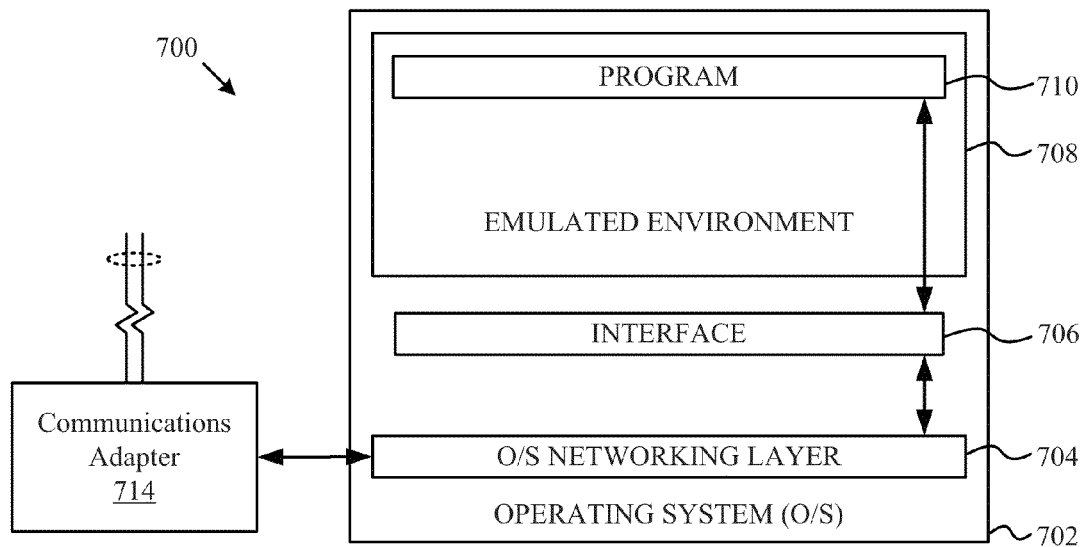
FIG. 7A is a block diagram illustrating a server hosting an emulated software environment for virtualization according to one embodiment of the disclosure.

FIG. 7A is a block diagram illustrating a. server hosting an emulated software environment for virtualization according to one embodiment of the disclosure. An operating system 702 executing on a server includes drivers for accessing hardware components, such as a networking layer 704 for accessing the communications adapter 714. The operating system 702 may be, for example, Linux. An emulated environment 708 in the operating system 702 executes a program 710, such as Communications Platform (CPComm) or Communications Platform for Open Systems (CPCommOS). The program 710 accesses the networking layer 704 of the operating system 702 through a non-emulated interface 706, such as an extended network input output processor (XNIOP). The non-emulated interface 706 translates requests from the program 710 executing in the emulated environment 708 for the networking layer 704 of the operating system 702.

Figure 7B:
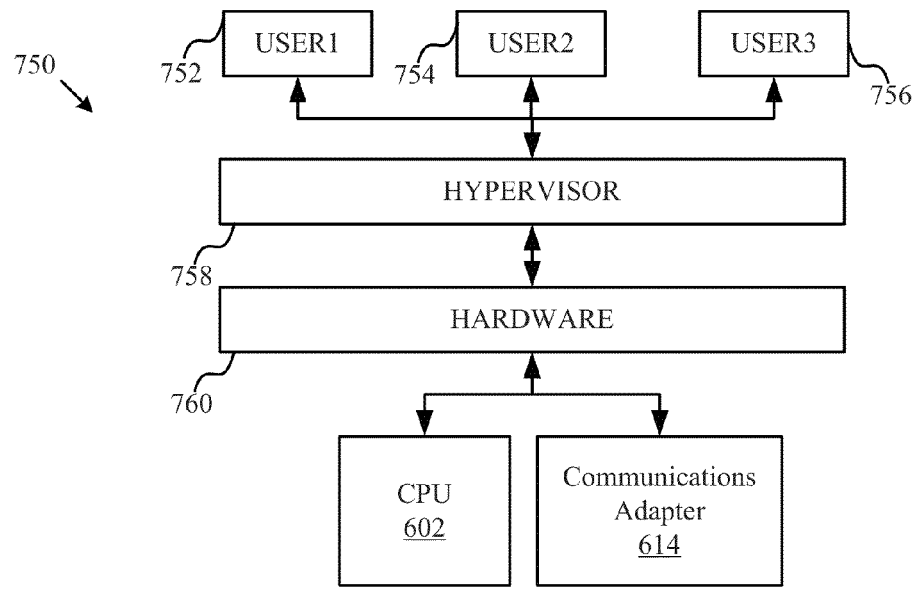
FIG. 7B is a block diagram illustrating a server hosting an emulated hardware environment according to one embodiment of the disclosure.

In another example, hardware in a computer system may be virtualized through a hypervisor. FIG. 7B is a block diagram illustrating a server hosting an emulated hardware environment according to one embodiment of the disclosure. Users 752, 754, 756 may access the hardware 760 through a hypervisor 758. The hypervisor 758 may be integrated with the hardware 760 to provide virtualization of the hardware 760 without an operating system, such as in the configuration illustrated in FIG. 7A. The hypervisor 758 may provide access to the hardware 760, including the CPU 602 and the communications adaptor 614.

If implemented in firmware and/or software, the functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method, comprising:
   retrieving, at a server from a security database, user security parameters for at least one user;
   retrieving, at the server from a system log, log files describing changes in the user security parameters for the at least one user;
   generating, at the server, a report comparing the user security parameters and the changes in the user security parameters;
   receiving, at the server, a date range input from a user for retrieving log files, in which the step of retrieving in files comprises retrieving log files corresponding to the date range input;
   determining, at the server, whether log files corresponding to the date range input are available in mass storage or tape; and
   when the server determines log files corresponding to the date range input are available in tape, prompting the user with a choice of only retrieving records available on the mass storage.

2. The method of claim 1, further comprising receiving, at the server, an input from a user to revert the user security parameters to a previous state.

3. The method of claim 2, further comprising applying, at the server, the previous state of user security parameters to the user.

4. The method of claim 3, in which the step of applying the previous state of user security parameters to the user comprises transmitting data to the security database hosted on a second server.

5. The method of claim 1, further comprising transmitting, to the user at a client computer, the report formatted as a hypertext markup language (HTML) document.

6. A computer program product, comprising:
   a non-transitory computer readable medium comprising code to perform the steps of:
   retrieving, at a server from a security database, user security parameters for at least one user;
   retrieving, at the server from a system log, log files describing changes in the user security parameters for the at least one user;
   generating, at the server, a report comparing the user security parameters and the changes in the user security parameters;
   receiving, at the server, a date range input from a user for retrieving log files, in which the step of retrieving log files comprises retrieving log files corresponding to the date range input;
   determining, at the server, whether log files corresponding to the date range input are available in mass storage or tape; and
   when the server determines log files corresponding to the data range input are available in tape, prompting the user with a choice of only retrieving records available on the mass storage.

7. The computer program product of claim 6, in which the medium further comprises code to perform the step of receiving an input from a user to revert the user security parameters to a previous state.

8. The computer program product of claim 7, in which the medium further comprises code to perform the step of applying, at a server, the previous state of user security parameters to the user.

9. The computer program product of claim 8, in which the medium further comprises code to perform the step of transmitting data to a security database on a second server.

10. The computer program product of claim 6, in which the medium further comprises code to perform the steps:
    receiving a date range input from a user for retrieving log files; and
    retrieving log files corresponding to the date range input.

11. The computer program product of claim 6, in which the medium further comprises code to perform the step of transmitting, to the user, the report formatted as a hypertext markup language (HTML) document.

12. An apparatus, comprising:
    a memory; and
    a processor coupled to the memory, in which the processor is configured to perform the steps of:
    retrieving, at a server from a security database, user security parameters for at least one user;
    retrieving, at the server from a system log, log files describing changes in the user security parameters for the at least one user;
    generating, at the server, a report comparing the user security parameters and the changes in the user security parameters;

receiving, at the server, a date range input from a user for retrieving log files, in which the step of retrieving log files comprises retrieving log files corresponding to the date range input;

determining, at the server, whether log files corresponding to the date range input are available in mass storage or tape; and when the server determines log files corresponding to the data range input are available in tape, prompting the user with a choice of only retrieving records available on the mass storage.

13. The apparatus of claim 12, in which the processor is further configured to perform the steps of:

receiving an input from a user to revert the user security parameters to a previous state; and applying, at a server, the previous state of user security parameters to the user.

14. The apparatus of claim 13, in which the processor is further configured to perform the step of transmitting data to a security database hosted on a second server.

15. The apparatus of claim 12, in which the processor is further configured to perform the step of transmitting, to the user, the report formatted as a hypertext markup language (HTML) document.

\* \* \* \* \*